US012602925B2

(12) United States Patent
Tissera et al.

(10) Patent No.: US 12,602,925 B2
(45) Date of Patent: Apr. 14, 2026

(54) HYPERSPECTRAL IMAGE ANALYSIS USING MACHINE LEARNING

(71) Applicant: MLVX Technologies Inc., Vancouver (CA)

(72) Inventors: Migel Dileepa Tissera, Coquitlam (CA); Francis George Doumet, Vancouver (CA); Parisa Asgharzadeh, Coquitlam (CA); Ahmed Sigiuk, Burnaby (CA)

(73) Assignee: MLVX TECHNOLOGIES INC., Vancouver (CA)

( * ) Notice: Subject to any disclaimer, the term of this patent is extended or adjusted under 35 U.S.C. 154(b) by 353 days.

(21) Appl. No.: 18/175,264

(22) Filed: Feb. 27, 2023

(65) Prior Publication Data

US 2024/0290091 A1     Aug. 29, 2024

(51) Int. Cl.
*G06V 20/10*        (2022.01)
*G06T 7/50*         (2017.01)
(Continued)

(52) U.S. Cl.
CPC .............. *G06V 20/194* (2022.01); *G06T 7/50* (2017.01); *G06V 10/58* (2022.01); *G06V 10/82* (2022.01);
(Continued)

(58) Field of Classification Search
CPC ...... G06V 20/194; G06V 10/58; G06V 10/82; G06V 10/95; G06V 10/143; G06T 7/50;
(Continued)

(56) References Cited

U.S. PATENT DOCUMENTS 8,897,571 B1 * 11/2014 Robinson ............... G06V 20/13
                                                  356/302
11,253,151 B2   2/2022 Zhang
                       (Continued)

FOREIGN PATENT DOCUMENTS

CN        115439679       12/2022
KR        10-2483521 A1    1/2023
                       (Continued)

OTHER PUBLICATIONS

Wang et al., "Single-Pixel Hyperspectral Imaging via an Untrained Convolutional Neural Network", Key Laboratory of Optoelectronic Devices and Detection Technology, School of Physics, Liaoning University, Shenyang 110036, China (Year: 2023).*
(Continued)

*Primary Examiner* — Vu Le
*Assistant Examiner* — Rachel Anne Ometz
(74) *Attorney, Agent, or Firm* — D'Ambrosio & Menon, PLLC; Usha Menon

(57)                ABSTRACT

Hyperspectral imaging is used to identify one or more materials in an object. The object is illuminated with light. At least some of the light is reflected by the object. A hyperspectral imaging sensor captures, based on the reflected light, one or more hyperspectral images of the object, the one or more hyperspectral images include hyperspectral data. The one or more hyperspectral images are input to a trained machine learning model. The trained machine learning model spectrally un-mixes the hyperspectral data so as to extract one or more spectral signatures from the hyperspectral data. Based on the one or more extracted spectral signatures, one or more materials comprised in the object are extracted. Another trained machine learning model is used to detect the shape of the object.

22 Claims, 6 Drawing Sheets

84

(51) Int. Cl.
    *G06V 10/58* (2022.01)
    *G06V 10/82* (2022.01)
    *G06V 10/94* (2022.01)
(52) U.S. Cl.
    CPC .... *G06V 10/95* (2022.01); *G06T 2207/10048*
    (2013.01); *G06T 2207/20081* (2013.01); *G06T*
    *2207/20084* (2013.01)
(58) Field of Classification Search
    CPC . G06T 2207/10048; G06T 2207/20081; G06T
    2207/20084
    See application file for complete search history.

(56)                    References Cited

U.S. PATENT DOCUMENTS

| | | | |
|---|---|---|---|
| 11,333,553 B2 | 5/2022 | Wissmann et al. | |
| 11,386,582 B1 | 7/2022 | Tissera | |
| 2015/0142461 A1* | 5/2015 | Darty | G16H 30/20 |
| | | | 705/2 |
| 2020/0264098 A1* | 8/2020 | Huang | G01N 21/31 |
| 2021/0285867 A1 | 9/2021 | Dumler et al. | |
| 2021/0383151 A1 | 12/2021 | Germain | |
| 2022/0138481 A1* | 5/2022 | Deshpande | G06V 10/764 |
| 2022/0268751 A1 | 8/2022 | Farkas et al. | |
| 2023/0023641 A1* | 1/2023 | Rosenfeld | G06V 10/60 |
| 2023/0027514 A1* | 1/2023 | Ma | G06T 7/181 |
| 2023/0419660 A1* | 12/2023 | Uljanovs | G06V 20/194 |
| 2024/0130646 A1* | 4/2024 | Thomas | G06V 40/15 |

FOREIGN PATENT DOCUMENTS

| | | |
|---|---|---|
| WO | WO2021209872 A1 | 10/2021 |
| WO | 2021/255458 A1 | 12/2021 |
| WO | 2021245374 A1 | 12/2021 |

OTHER PUBLICATIONS

International Search Report and Written Opinion of PCT International Application No. PCT/CA2023/051676, dated Mar. 15, 2024.
Licciardi, G. A. et al., "Pixel Unmixing in Hyperspectral Data by Means of Neural Networks" IEEE Transactions on Geoscience and Remote Sensing, vol. 49, Issue: 11, pp. 4163-4172, Aug. 1, 2011, retrieved from https://ieeexplore.ieee.org/document/5967899.

Ghosh, P. et al., "Deep Hyperspectral Unmixing using Transformer Network", arXiv.org, v1, pp. 1-13, Mar. 31, 2022, retrieved from https://arxiv.org/abs/2203.17076.
Hu, X. et al. "A Lightweight 1-D Convolution Augmented Transformer with Metric Learning for Hyperspectral Image Classification" Sensors 2021, 21(5), 1751, pp. 1-20, Mar. 3, 2021, retrieved from https://www.mdpi.com/1424-8220/21/5/1751.
Deng, Y-J. et al. "Robust Patch Tensor-based Multigraph Embedding for Dimensionality Reduction of Hyperspectral Images", IGARSS 2022-2022 IEEE International Geogscience and Remote Sensing Symposium, Kuala Lumpur, Malaysia, pp. 1149-1152, Jul. 22, 2022, retrieved from https://ieeexplore.ieee.org/document/9883148.
Wan, L., et al. "Hyperspectral Unmixing Based on Spectral and Sparse Deep Convolutional Neural Networks", IEEE Journal of Selected Topics in Applied Earth Observations and Remote Sensing, vol. 14, pp. 11669-11682, Nov. 9, 2021, retrieved from https://ieeexplore.ieee.org/document/9609631.
Ahmed, A.M. et al., "Hybrid Spectral Unmixing: Using Artificial Neural Networks for Linear / Non-Linear Switching", Remote Sens. 2017, 9(8), 775, pp. 1-22, Jul. 29, 2017, retrieved from https://www.mdpi.com/2072-4292/9/8/775.
Bera, S. et al., "Advances in Hyperspectral Image Classification Based on Convolutional Neural Networks: A Review", Computer Modeling in Engineering & Sciences, vol. 133, No. 2, pp. 1-30, Jul. 21, 2022, retrieved from https://www.techscience.com/CMES/v133n2/48965.
International Search Report and Written Opinion of PCT International Application No. PCT/CA2023/051374, dated Jan. 8, 2024.
Huang et al. Deep Networks with Stochastic Depth. arXiv:1603.09382, Jul. 28, 2016.
Kalra. Attention Networks: A simple way to understand Self Attention. Webpage < https://medium.com/@geetkal67/attention-networks-a-simple-way-to-understand-self-attention-f5fb363c736d>, 21 pages, Jun. 5, 2022. Retrieved on Dec. 6, 2023.
Scheibenreif et al. Masked Vision Transformers for Hyperspectral Image Classification. Proceedings of the IEEE/CVF Conference on Computer Vision and Pattern Recognition (CVPR) Workshops, 2023, pp. 2166-2176.
Liu, Zongbin et al. "Intelligent identification of film on cotton based on hyperspectral imaging and convolutional neural network", Science Progress, 2022, vol. 105(4) 1-21, DOI: 10.1177/00368504221137461.

\* cited by examiner

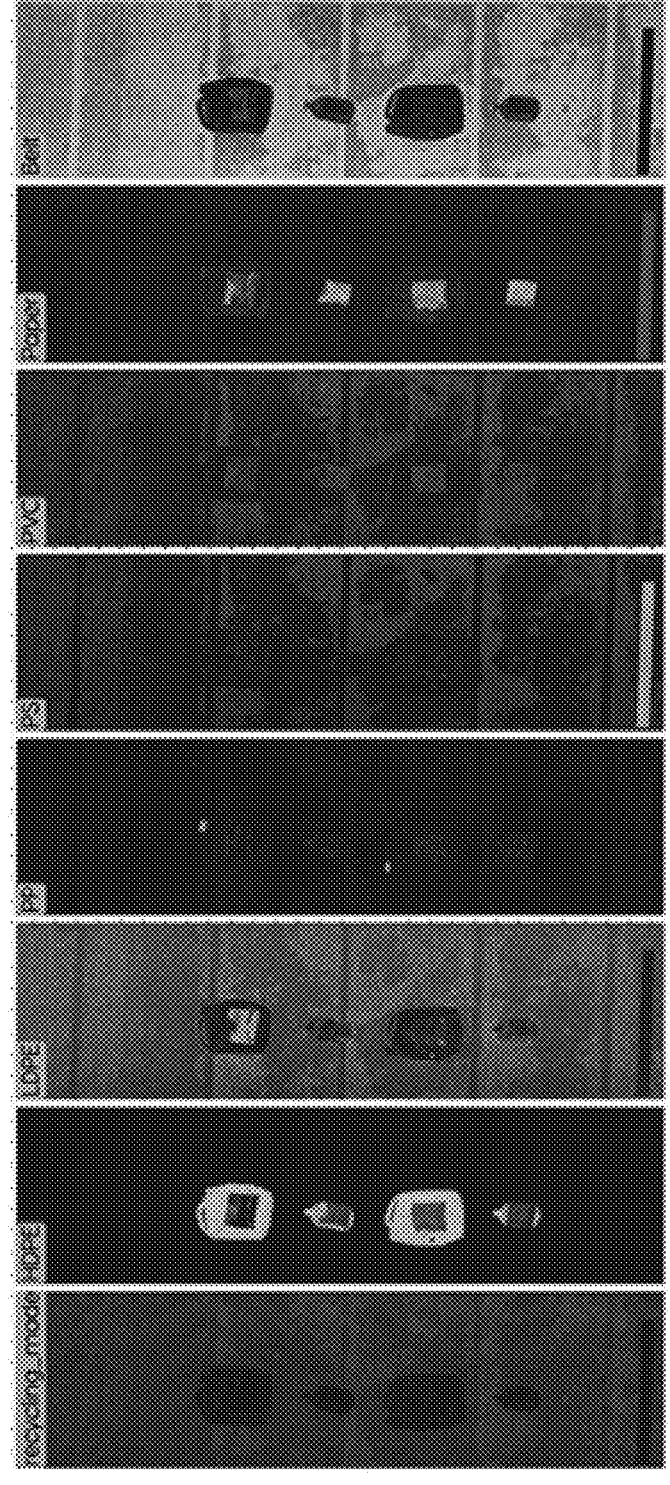
FIG. 6
84

HYPERSPECTRAL IMAGE ANALYSIS USING MACHINE LEARNING

FIELD

The present disclosure relates to material identification, and in particular to methods and systems for performing hyperspectral image analysis of materials with the aid of machine learning.

BACKGROUND

Hyperspectral, or hyperspectral, imaging is a tool used for identifying the material composition of objects. Different materials absorb and reflect light differently, producing a "reflective fingerprint" or "spectral signature" which can be used to identify the material that reflected the light. Transparent materials, however, present several challenges.

For example, because of the object's transparent nature, the reflected light contains not only the signature of the transparent material but also that of any underlying material (e.g. flooring or a conveyor belt), or a combination of spectral signatures of the transparent material, the underlying material, and those of other objects around it. Furthermore, the reflected light is usually extremely faint and when processed may have a low Signal-to-Noise Ratio (SNR). This combination of mixed spectral signatures (i.e. an overall spectral signature consisting of a mixture of different individual spectral signatures) and low SNR becomes a formidable challenge for existing material detection algorithms to overcome.

SUMMARY

According to a first aspect of the disclosure, there is provided a method of using hyperspectral imaging to identify one or more materials in an object, comprising: illuminating the object with light (for example, full-spectrum light), wherein at least some of the light is reflected by the object; using a hyperspectral imaging sensor to capture, based on the reflected light, one or more hyperspectral images of the object, the one or more hyperspectral images comprising hyperspectral data; inputting the one or more hyperspectral images to a trained machine learning model; using the trained machine learning model to spectrally un-mix the hyperspectral data so as to extract one or more spectral signatures from the hyperspectral data; and identifying, based on the one or more extracted spectral signatures, one or more materials comprised in the object.

The object may be at least partially transparent to visible light.

The object may be a multilayered object, each layer comprising one or more materials.

The light may have at least an infrared component.

The trained machine learning model may comprise at least one trained neural network, such as a convolutional neural network (CNN), a fully-connected neural network, a transformer, or a recurrent network.

The neural network may be a CNN comprising one or more 1-dimensional convolutions.

Extracting the one or more spectral signatures from the hyperspectral data may comprise: identifying, within the hyperspectral data, one or more spectral signatures, each identified spectral signature corresponding to a respective spectral signature in a set of predefined spectral signatures associated with predefined materials; and extracting the one or more identified spectral signatures.

Inputting the one or more hyperspectral images to the trained machine learning model may comprise: compressing, using a first computer device, the one or more hyperspectral images; transmitting the compressed one or more hyperspectral images over a computer network to a second computer device; decompressing, using the second computer device, the compressed one or more hyperspectral images; and inputting decompressed one or more hyperspectral data images to the trained machine learning model.

The first computer device may comprise a Field-Programmable Gate Array (FPGA).

The second computer device may comprise an FPGA.

During the illuminating, the object may be moving relative to the hyperspectral imaging sensor.

The trained machine learning model may be a first trained machine learning model, and the method may further comprise determining, using a second trained machine learning model and based on the one or more hyperspectral images, a shape of the object.

Determining the shape of the object may comprise: obtaining visible image data of the object; inputting the visible image data to the second trained machine learning model; and using the second trained machine learning model to determine, based on the visible image data, the shape of the object.

The second trained machine learning model may comprise a neural network, such as a CNN comprising one or more 2-dimensional convolutions.

Obtaining the visible image data may comprise extracting the visible image data from the one or more hyperspectral images.

Identifying the one or more materials may comprise: identifying, for each of the one or more materials, an amount of the material relative to an amount of each other material.

Each hyperspectral image may comprise pixels. Spectrally un-mixing the hyperspectral data may comprise extracting, for each pixel, one or more spectral signatures from the hyperspectral data associated with the pixel. Identifying the one or more materials may comprise identifying, for each pixel and based on the one or more extracted spectral signatures, one or more dominant materials in a portion of the object corresponding to the pixel.

Identifying the one or more dominant materials may comprise: identifying, for at least one pixel of the pixels, multiple materials in the portion of the object corresponding to the at least one pixel; and identifying, from among the multiple materials, the one or more dominant materials.

Identifying the one or more dominant materials may comprise: applying one or more thresholds to each spectral signature associated with each of the multiple materials; and identifying the one or more dominant materials based on the application of the one or more thresholds.

Identifying the one or more dominant materials may comprise: for each of one or more other pixels of the pixels, determining at least one dominant material in a portion of the object corresponding to the other pixel; and identifying the one or more dominant materials based on each determined dominant material of each other pixel.

According to a further aspect of the disclosure, there is provided a hyperspectral imaging system comprising: a light source for emitting light; a hyperspectral imaging sensor; one or more computer processors; and a computer-readable medium storing computer program code configured, when executed by the one or more computer processors, to cause the one or more computer processors to perform a method comprising: controlling the light source to illuminate an object; receiving, from the hyperspectral imaging sensor, one or more hyperspectral images of the object captured in response to at least some of the emitted light being reflected by the object and being received at the hyperspectral imaging sensor, the one or more hyperspectral images comprising hyperspectral data; inputting the one or more hyperspectral images to a trained machine learning model; using the trained machine learning model to spectrally un-mix the hyperspectral data so as to extract one or more spectral signatures from the hyperspectral data; and identifying, based on the one or more extracted spectral signatures, one or more materials comprised in the object.

According to a further aspect of the disclosure, there is provided a computer-readable medium storing computer program code configured, when executed by a processor, to cause the processor to: receive one or more hyperspectral images of an object, the one or more hyperspectral images comprising hyperspectral data; input the one or more hyperspectral images to a trained machine learning model; use the trained machine learning model to spectrally un-mix the hyperspectral data so as to extract one or more spectral signatures from the hyperspectral data; and identify, based on the one or more extracted spectral signatures, one or more materials comprised in the object.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIGS. 4A-6 show different outputs generated by a post-processing module of a hyperspectral imaging system, according to an embodiment of the disclosure.

DETAILED DESCRIPTION

Figure 1:
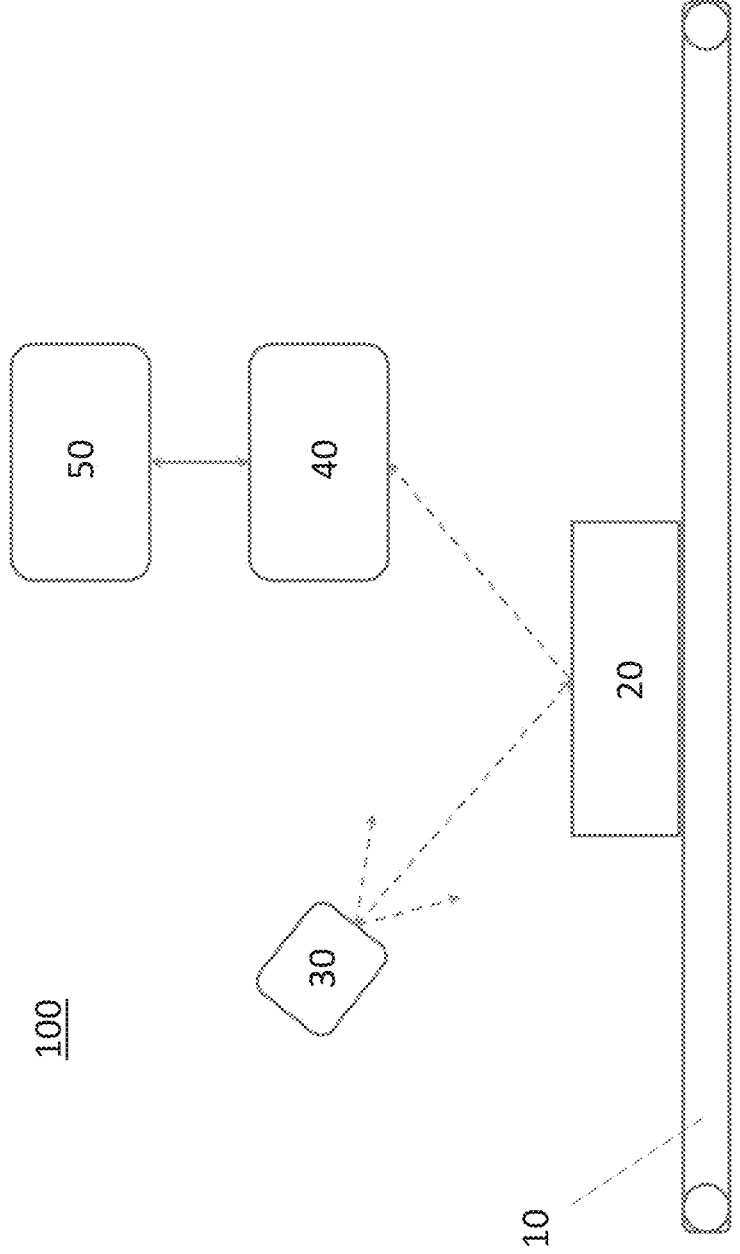
FIG. 1 is a schematic diagram of a hyperspectral imaging system according to an embodiment of the disclosure.

The present disclosure seeks to provide novel methods and systems for performing hyperspectral imaging and analysis. While various embodiments of the disclosure are described below, the disclosure is not limited to these embodiments, and variations of these embodiments may well fall within the scope of the disclosure which is to be limited only by the appended claims.

Throughout the disclosure, the term "hyperspectral" is used. Generally, hyperspectral is considered to refer to about 30-300 wavelength "spectral" bands. However, embodiments of the present disclosure may use any suitable number of wavelength bands, for example less than 30 bands or more than 300 spectral bands.

Generally, embodiments of the disclosure relate to methods and systems for identifying materials in an object, using hyperspectral imaging. The identification is facilitated by the use of an appropriately trained machine learning model, such as a deep learning model, comprising for example one or more convolutional neural networks (CNNs). Other types of suitably trained neural networks may be used, such as fully-connected feedforward, recurrent networks, Autoencoders, or Transformers. The neural networks may be trained to detect the materials within transparent objects with a relatively high degree of accuracy (e.g. at least 90%). The neural networks may additionally analyze up to 100% of the object's material, as opposed to a subsample of the object's material(s). This is in contrast to existing methods of material identification that, because of data volume requirements, typically resort to sampling only a few areas of the object, or only look at specific spectral bands (to reduce the size of the spectral data), thereby frequently misidentifying an object's material if the object comprises more than one material.

Generally, according to embodiments of the disclosure, deep neural networks are used to spectrally un-mix visible-to-infrared spectral signals generated by a hyperspectral imaging sensor capturing light reflected by the object. This spectral un-mixing allows the spectral signatures specific to the materials of the transparent object (i.e. end-members) to be extracted, while ignoring the spectral signature(s) of any underlying materials (e.g. of any materials belong to a different object to the one being analyzed). In particular, the deep neural networks may spectrally un-mix one or more spectral signatures of the object and classify them according to one or more corresponding end-member categories (an end-member category referring to a material that a given spectral signature is associated with). This in turn allows for retrieval of an overall spectral signature of the transparent object, even in low-SNR situations.

Generally, according to embodiments of the disclosure, there is provided a method of using hyperspectral imaging to identify one or more materials in an object. The method includes illuminating the object with light, wherein at least some of the light is reflected by the object. The light may comprise any of, or a combination of, visible, near-infrared, short-wave infrared, mid-wave infrared, and long-wave infrared light. A hyperspectral imaging sensor is then used to capture one or more hyperspectral images of the object, based on the reflected light. The hyperspectral images include spectral data within each of multiple wavelength bands, the number of bands depending on the sensitivity and nature of the hyperspectral imaging sensor. The greater the number of wavelength bands that are used, the greater the resolution of the data but the greater the data-processing requirements of the overall system.

In order to better manage the potentially large volumes of data that are generated by the hyperspectral imaging sensor, the data may be compressed and then transmitted to a remote image processing device better equipped for downstream image processing and analysis. The compressed data is then decompressed prior to processing.

The hyperspectral images are then input to a trained machine learning model, such as a deep learning model, which may include, for example, one or more convolutional neural networks (CNNs). As described above, these deep neural networks are then used to spectrally un-mix the spectral data within the hyperspectral images so as to extract one or more spectral signatures from the hyperspectral data. Based on the one or more extracted spectral signatures, one or more materials comprised in the object may be identified. According to some embodiments, the relative quantities of different materials may be identified.

Turning now to FIG. 1, there is shown a schematic diagram of a hyperspectral imaging system 100 according to an embodiment of the disclosure.

Hyperspectral imaging system 100 generally includes a device, such as a conveyor 10, for transporting objects 20 to be analyzed. One such object 20 is shown on conveyor 10 in FIG. 1. Object 20 is at least partially transparent to visible light, and for example may only reflect up to about X % of light.

Positioned at a distance from object 20 is a light source 30 such as broadband (i.e. full-spectrum) light sources. The distance separating object 20 from light source 30 is generally configurable and may depend, for example, on the intensity of light source 30 as well as the size of the area to be imaged. Light source 30 is configured to emit light having at least an infrared component, and for example is configured to emit broadband light in a wavelength range of 400 nm-2,500 nm.

Although only one light source is shown in FIG. 1, multiple light sources may be used. For instance, a light source in front of the object and a symmetrically positioned light source at the rear of the object may be used. At least some of the light emitted by light source 30 is reflected by object 20 and is received at a hyperspectral imaging sensor 40 positioned and configured to detect infrared light reflected by object 20. According to one embodiment, hyperspectral imaging sensor 40 may be a Specim™ FX10, FX17, FX50, or short-wave infrared hyperspectral imaging camera. According to some embodiments, black materials may reflect light in the 2.7-5.3 µm range, while other materials may typically reflect light in the 0.9 to 5.3 µm range.

An edge processing device 50, comprising a Field-Programmable Gate Array (FPGA), is communicatively coupled to hyperspectral imaging sensor 40 and is configured to receive (e.g. using wired or wireless means) the hyperspectral images captured by hyperspectral imaging sensor 40.

Hyperspectral imaging system 100 may be configured to process an assembly line of objects 20, with a series of objects 20 to be analyzed being conveyed by conveyor 10. According to some embodiments, instead of objects 20 being conveyed by conveyor 10, objects 20 may be stationary and, instead, one or more of light source 30 and hyperspectral imaging sensor 40 may be configured to be movable relative to objects 20. This is typically the case with aerial or orbital hyperspectral imaging, where the sun provides the required full-spectrum broadband lighting, and the hyperspectral imaging sensor and end-processing device are mounted on a moving platform such as a satellite or an airplane. According to still further embodiments, object 20, light source 30, and hyperspectral imaging sensor 40 may all be stationary.

As each object 20 is illuminated by light source 30, hyperspectral imaging sensor 40 receives light reflected by object 20 and captures visible-to-infrared imagery of object 20. Because of the transparent nature of object 20, materials within the interior of object 20 also reflect light, and this light may be captured by hyperspectral imaging sensor 40 which may subsequently generate hyperspectral images of such underlying materials. Therefore, hyperspectral imaging sensor 40 may capture hyperspectral images of each layer, or each material, in a multi-layer object. The hyperspectral images generally include hyperspectral data as a function of location, or position, within object 20.

Because of the relatively large volumes of data generated by hyperspectral imaging sensor 40 (for example, 1 Gbps or more), it is preferable to first compress the hyperspectral images prior to processing. Accordingly, edge processing device 50 is configured to compress the hyperspectral images using any of various suitable compression techniques that may be known in the art. According the some embodiments, edge processing device 50 may employ one or more of the compression techniques described in U.S. Pat. No. 11,386,582 B1, incorporated herein by reference in its entirety. Such compression techniques may be implemented and accelerated on one or more FPGAs to compress the data down to as little as 10% of its original size, and accelerate the transmission of the data to a downstream processing device, as described in further detail below.

Figure 2:
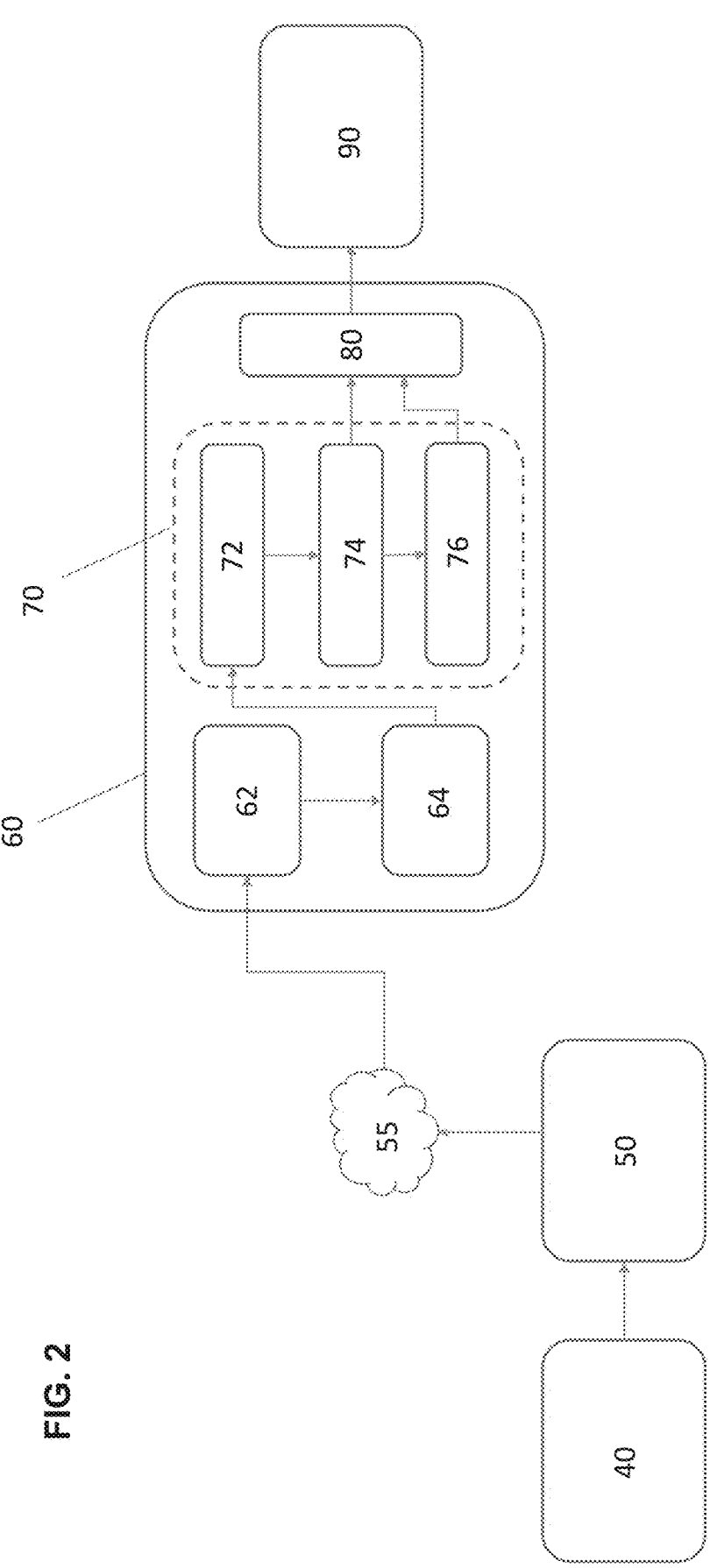
FIG. 2 is a schematic diagram of a hardware and software modules used for processing hyperspectral images, according to an embodiment of the disclosure.

Turning now to FIG. 2, there is shown a schematic diagram of hardware and software modules used in combination with hyperspectral imaging system 100, according to an embodiment of the disclosure.

As seen in FIG. 2, hyperspectral imaging sensor 40 transmits hyperspectral images to edge processing device 50 which, as described above, compresses the hyperspectral images. The compressed data is then transmitted over a computer network 55, such as a computer network with network switches and cables, to a computer server 60. For example, a single computer server may be used to analyze multiple streams of incoming data. This may enable spectral analysis of materials pixel-by-pixel using multiple hyperspectral sensors. According to some embodiments, and based on the configuration of the lens of the hyperspectral sensor, materials or objects as little as 2 mm in diameter (i.e. the pixel size being 2 mm×2 mm) can be identified with a hyperspectral imaging sensor mounted approximately 90 cm above the object.

Server 60 includes a second FPGA 62 that receives the compressed data from edge processing device 50 and decompresses the data stream in real-time. The decompressed hyperspectral images are then fed to either, or both, a Graphics Processing Unit (GPU) 64 or a Tensor Processing Unit (TPU) (not shown in FIG. 2). GPU 64 and/or the TPU are configured to execute a trained machine learning model comprising deep neural networks 70. As described in further detail below, neural networks 70 are trained and configured to: (1) spectrally un-mix one or more spectral signatures in the spectral data stream; (2) classify the un-mixed signatures according to one or more end-members; and (3) determine the shape of the object. In particular, neural networks 70 include a spectral un-mixer 72, a spectral classifier 74, and an object detector 76. The output of spectral un-mixer 72 is fed into spectral classifier 74. The outputs of spectral classifier 74 and object detector 76 are provided to a post-processing module 80 which post-processes the data as described in further detail below, and outputs, for example, data 90 (for example, one or more images) indicating a shape of object 20 as well as relative quantities of one or more materials comprised in object 20. The neural networks described above can be combined into a single neural network, two neural networks, or three distinct neural networks as in the case shown in FIG. 2.

While compression of the data and transmission of the compressed data to computer server 60 may be useful, according to some embodiments edge processing device 50 may itself process the hyperspectral images without the need to transfer the data to computer server 60. In other words, according to some embodiments, edge processing device 50 may perform the function of computer server 60, and may execute the neural networks used to identify the materials within object 20.

Figure 3:
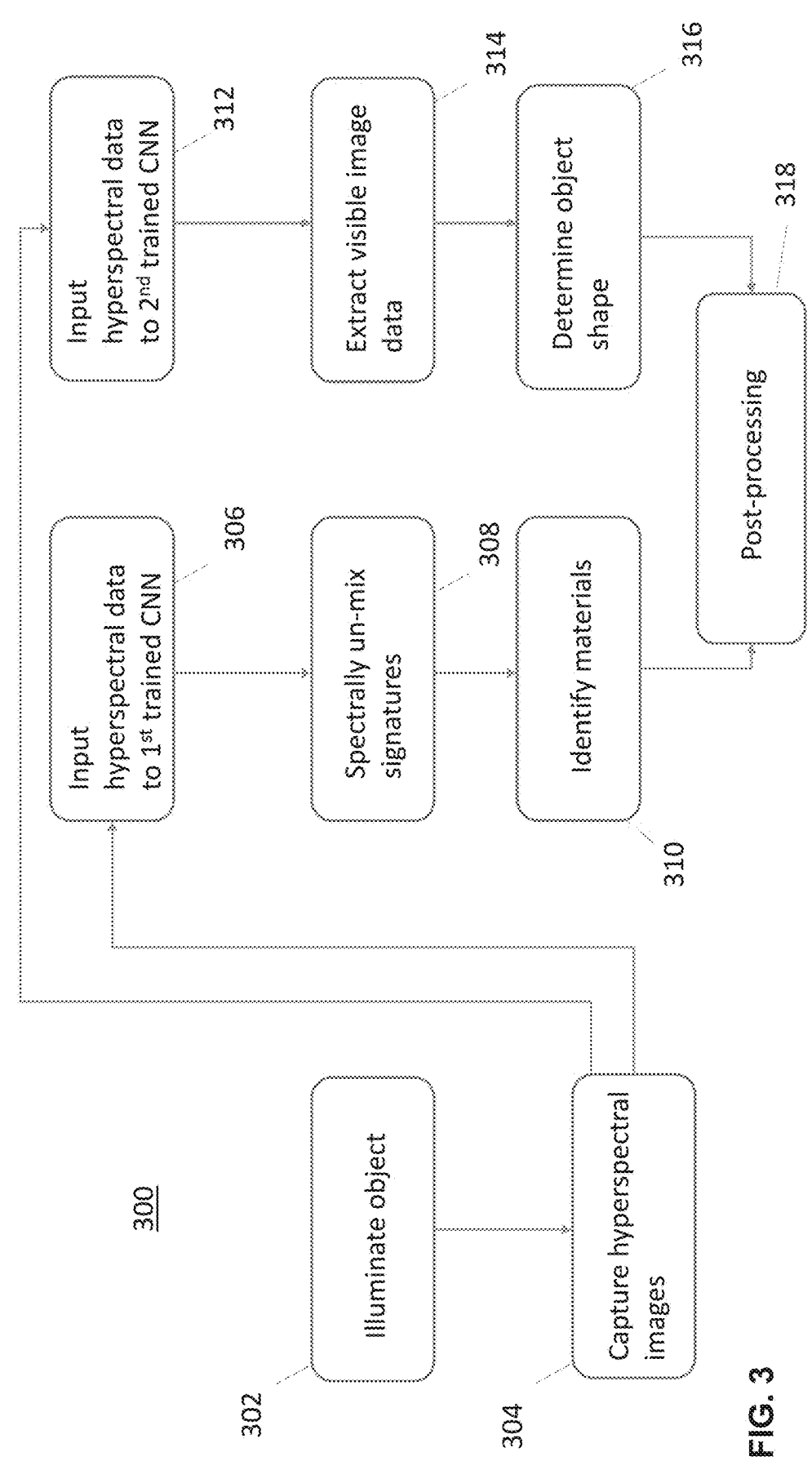
FIG. 3 is a flow diagram of a method of performing hyperspectral imaging according to an embodiment of the disclosure.

Turning now to FIG. 3, there is shown a flow diagram of a general method of performing hyperspectral imaging according to an embodiment of the disclosure.

Starting at block 302, object 20 is illuminated by visible-to-infrared (full-spectrum) light source 30.

At block 304, one or more hyperspectral images of object 20 are captured by hyperspectral imaging sensor 40, based on reflected light received at hyperspectral imaging sensor 40. The sensitivity of hyperspectral imaging sensor 40 may depend on the particular material(s) that is/are being detected. For example, near-infrared sensors may operate between 900-1,700 nm, whereas middle wavelength infrared sensors may operate between 2,700-5,300 nm.

At block 306, the hyperspectral image data (e.g. spectral information along the spectral dimension) is input to a first trained CNN (or, more generally, a first trained neural network).

At block 308, the first trained CNN spectrally un-mixes one or more spectral signatures from the hyperspectral image data.

At block 310, based on the extracted spectral signatures, the relative quantities of different materials within object 20 are identified.

At block 312, the hyperspectral image data is input to a second trained CNN (or, more generally, a second trained neural network).

At block 314, the second trained CNN extracts visible image data (e.g. spatial information) from the hyperspectral image data.

According to some embodiments, instead of extracting the visible image data from the hyperspectral image data, the visible image data may be obtained from a secondary RGB camera, for example.

At block 316, based on the extracted visible image data, a shape of object 20 is determined.

At block 318, the outputs of blocks 310 and 316 are combined and post-processed, as described in further detail below.

According to embodiments of the disclosure, the deep neural networks responsible for spectrally un-mixing the spectral data, and classifying the extracted spectral signatures, are designed using convolutional or Transformer neural networks that process the input imagery pixel-by-pixel. In other words, each of spectral un-mixer 72 and spectral classifier 74 takes as its input a given pixel and all of its associated spectral information.

In addition to convolutions, vectors representing pixels are passed through each neural network (i.e. both spectral un-mixer 72 and object detector 76) in a feed-forward fashion to different layers of the network, including but not limited to dropout layers, batch normalization layers, average/max pooling layers, fused-layers (i.e. concatenation of different layer outputs), skip-connections, and different non-linearities as the hidden layer activations (e.g. rectified linear unit or sigmoid function), and finally to an output layer. The dimension of each output layer matches the number of end-members that the spectral signatures will be un-mixed into.

To illustrate this concretely, take for example the detection of five different kinds of transparent plastic on a waste stream passing through a conveyor belt system. The five different plastic types may be, for example, PET (Polyethylene terephthalate), PP (Polypropylene), PS (Polystyrene), HDPE (High-density Polyethylene), and LDPE (Low-Density Polyethylene), and are associated with five different end-members. The "background" of the conveyor belt is added as another distinct end-member, leading to a total of six end-members into which captured spectral signatures would be un-mixed.

The eventual output vector is a softmax layer, meaning the summation of the components in the vector is equal to 1. Each element in the vector represents the "abundance factor" (i.e. the ratio) of that end-member spectrum to the original reference spectral data of each end-member. For example, assuming the end-members are in the order of PET, PP, PS, HDPE, LDPE, and Belt, a vector (0.1, 0.15, 0.2, 0.25, 0.28, 0.02) would mean that the input spectral signature consisted of 10% PET, 15% PP, 20% PS, 25% HDPE, 28% LDPE and 2% Belt. More generally, following on from the above, example, the output would be a vector with $x_1\%$ of PET, $x_2\%$ of PP, $x_3\%$ of PS, $x_4\%$ of HDPE, $x_5\%$ of LDPE, and $x_6\%$ of "conveyor belt", wherein the sum of the $x_i$ values is 1.

Training the deep neural networks is achieved using synthetic data that is generated at training time using clean and opaque end-member spectra that have been captured in a laboratory setting. Revisiting the above example, this would mean that clean and opaque spectral signatures of each of the six different material types (PET, PP, PS, HDPE, LDPE, and Conveyor Belt) have been captured before training begins.

At the beginning of the training, spectral signatures are sampled for each of the six categories and are used to create a Dirichlet distribution vector that sums to 1. This vector represents the abundance factors which are used to create a weighted sum. In other words, the assumption is that each material comprises a linear combination of its end-members. For example, the spectral signature of a multilayered material may equal, for example, 0.1*(spectral signature of PET)+0.9*(spectral signature of nylon).

The training begins by describing the generation of a synthetic data point X which is used as a training vector $X\in R(N\times1)$, where R denotes real numbers and N is the dimension of the spectral signature (i.e. the number of wavelength bands contained in the spectral signature). Given a set of end-member spectra $K\in R(L\times N)$, where L is the number of end-members and each end-member is a spectral signature of dimension (N×1), the training vectors are generated as follows. Note that the end-member spectra also include the target spectral signatures that are to be detected. The training dataset includes the "ground truth", i.e. the end-member(s) that actually relate to the spectral signature(s) in question.

First, abundance factors A are generated, where $A\in R(L\times 1)$. The abundance factors are to be used to generate the synthetic training vector, using a Dirichlet distribution. A Dirichlet-distributed random variable can be seen as a multivariate generalization of a Beta distribution, and is a conjugate prior of a multinomial distribution in Bayesian inference. A vector of length L (the number of end-members to be mixed) is generated, and the Dirichlet distribution ensures that the sum of the vector's components is equal to 1. This vector then provides the abundance factors (i.e. the weights to be used) in a weighted sum for linear mixing of the end-member spectra.

The training vector is then created using a weighted sum of the end-member spectra and the randomly generated abundance factors, as follows:

$$X = \sum_{i=1}^{L} A_i \times K_i$$

In practice, the synthetic data points are generated at run-time, with each training data point in each mini-batch containing different abundance factors. In the case where there is more than one available spectral signature per end-member, one spectral signature is randomly sampled per end-member, per training data point. For example, the training dataset could have two different signatures for PET (e.g. one for white PET and one for orange PET). As another example, different grades of a particular material could have different spectral signatures. This creates a relatively wide array of training data points and provides a very good underlying distribution for the training dataset. Additionally, white or Gaussian noise is added to each generated data point to further increase the robustness of the neural network.

Since the training process is supervised, ground-truth outputs are needed for training the neural network. Since the goal is to un-mix mixed spectra, the ground-truth is the vector of abundance factors A. Therefore, for each training data point, X is the input, and A is the ground-truth to the neural network.

In order to train object detector 76, the hyperspectral image data is converted to visible image data by creating a hyperspectral, or a 3-channel (e.g. RGB) image, by averaging wavelength-ranges of the hyperspectral image data (which may comprise, for example, a hyperspectral data cube). Once this conversion from hyperspectral data cube to a multispectral or a 3-channel data cube is completed, a deep learning-based 2D object detector network, such as Retina-Net, Faster R-CNN, Yolo, EfficientDet, or any custom-designed object detection neural network may be used to train object detector 76.

According to some embodiments, instead of extracting the visible image data from the hyperspectral image data, the visible image data may be obtained from a secondary RGB camera, for example.

The results of spectral classifier 74 and object detector 76 therefore enable the identification of each material in the object, as well as its amount relative to other materials in the object, and also the shape of the object. These results may be combined and post-processed in post-processing module 80.

For example, post-processing module 80 may minimize the incidence of false positives or false negatives at the pixel-level by applying one or more post-processing algorithms such as Conditional Random Fields (CRF) to the output of spectral classifier 74 and/or object detector 76. Post-processing module 80 may additionally, at the pixel-level, correct or otherwise adjust the output of spectral classifier 74 and/or object detector 76 based, for example, on one or more pre-set or empirically-determined rules.

As an example, the output of spectral classifier 74 may identify a particular pixel as comprising a certain percentage of a first spectral signature associated with a first material, and a certain percentage of a second spectral signature associated with a second material. Post-processing module 80 may be configured to apply one or more thresholds to these outputs, and may adjust the outputs based on these thresholds. For instance, post-processing module 80 may ignore the first spectral signature associated with the first material if the percentage associated with the first spectral signature is below a certain threshold.

In another example, post-processing module 80 may adjust the output of spectral classifier 74 for a particular pixel based, for example, on the output of spectral classifier 74 in respect of other pixels. For instance, if spectral classifier 74 identifies a particular pixel as primarily comprising a spectral signature associated with a certain plastic, while all other pixels surrounding this pixel are identified as primarily comprising a spectral signature associated with paper (e.g. for a label), then post-processing module 80 may be configured to adjust the spectral signature of the particular pixel so that the spectral signature is that of paper. Such corrections may be required, for example, because light from the light source may scatter off the surface of the object, or the surface of the object may be contaminated with dirt (thereby affecting the output of spectral classifier 74).

As another example, depending on the wavelength of the light that is used, the light may penetrate the outer layer of the object and interact with an underlying layer. Taking the example of a plastic bottle with a paper label, some light may penetrate the label and may be reflected by the plastic underlying the label. As a result, spectral classifier 74 may classify pixels associated with the label as comprising both a proportion of a plastic spectral signature and a paper spectral signature. Post-processing module 80 may therefore be configured to adjust the output of spectral classifier 74 in respect of this pixel so that the dominant spectral signature of the pixel is that of paper and not plastic.

Figure 4:
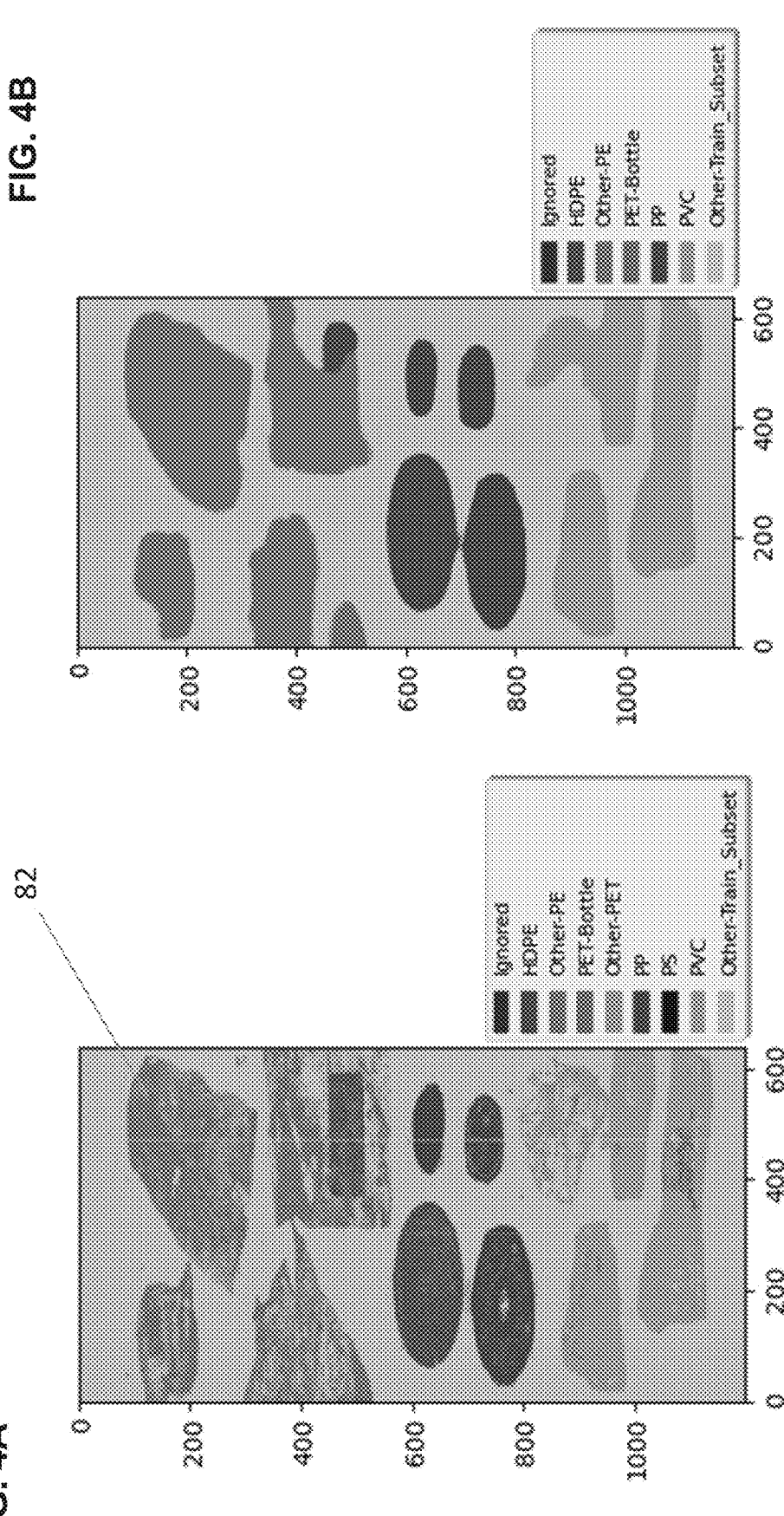

FIGS. 4A-6 illustrate examples of the output of post-processing module 80. For example, as can be seen in FIG. 4A, the shapes of different objects 82 have been identified, as have their respective dominant materials. The output of FIG. 4A shows a significant degree of noise associated with each object 82. Post-processing module 80 may therefore apply one or more CRF algorithms to "clean up" the noise and properly identify the spectral signature associated with each pixel of each object 82, as can be seen by the output illustrated in FIG. 4B.

Figure 5:
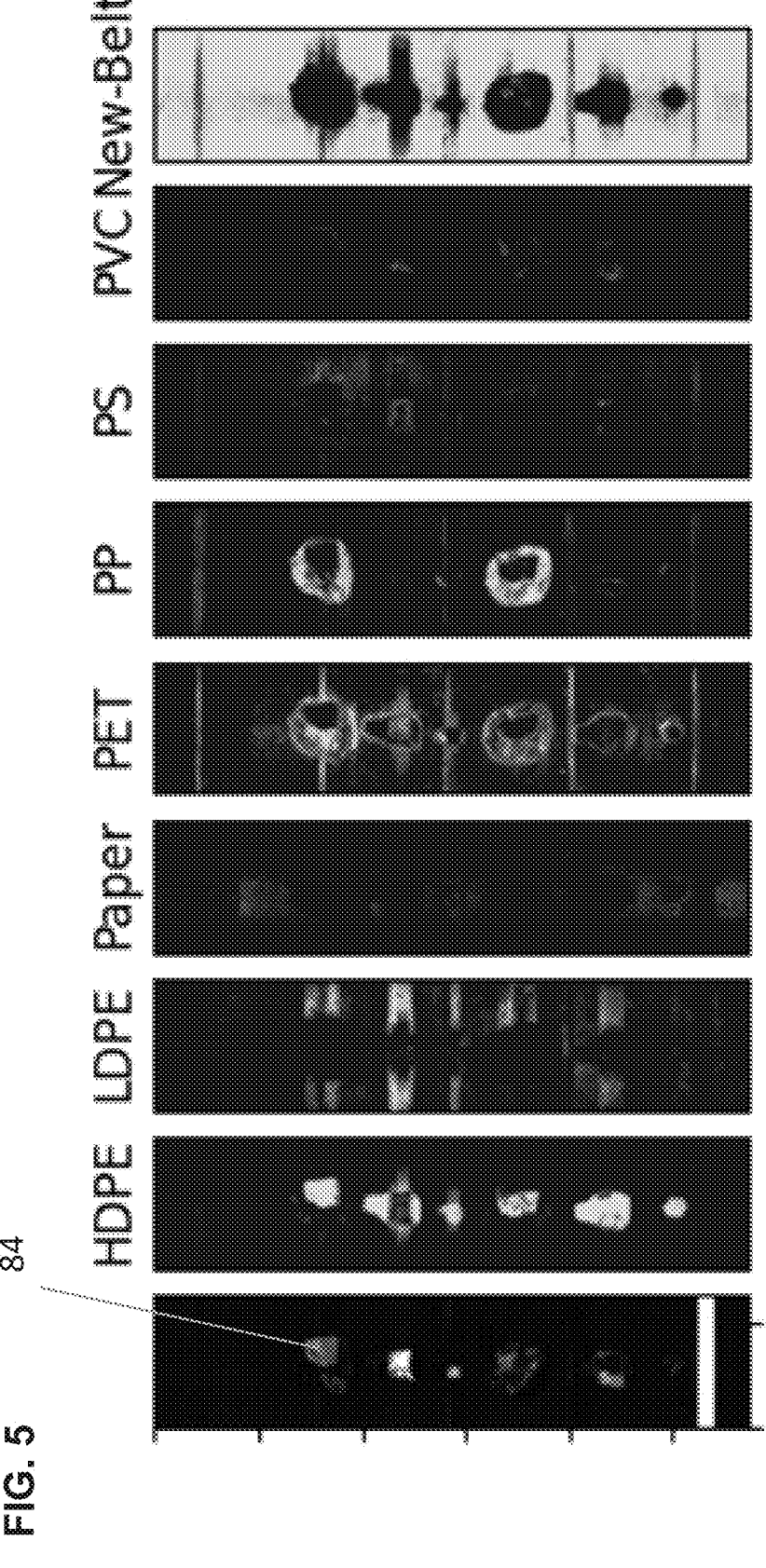

FIGS. 5 and 6 similarly illustrate example outputs of post-processing module 80, showing the identification of different materials in different objects 84. In the case of FIG. 6, the objects being analyzed are milk bottles.

Advantageously, embodiments of the disclosure may be used to analyze up to 100% of an object's materials. This may allow users to define relatively complex rules for processing the object. For example, a user may define a rule such that: "If an object of material X is wrapped by material Y over more than 90% of its surface area, then remove the object from the conveyor belt."

Furthermore, materials may be identified in milliseconds, allowing embodiments of the disclosure to be deployed in applications requiring real-time analysis such as high-throughput sorting and quality assurance/control in numerous manufacturing and defence use-cases. For example, in certain defence use-cases, identifying CBRN (i.e. Chemical, Biological, Radioactive/Radiological, and Nuclear) materials in real-time is key to saving lives.

The embodiments have been described above with reference to flowcharts and block diagrams of methods, apparatuses, systems, and computer program products. In this regard, the flowcharts and block diagrams in the figures illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general-purpose computer, special-purpose computer, or other programmable data processing apparatus to produce a machine, such that the instructions, which execute via the processor of the computer or other programmable data-processing apparatus, create means for implementing the functions or acts specified in the blocks of the flowcharts and block diagrams.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of using hyperspectral imaging to identify one or more materials in an object, comprising:

12 illuminating the object with light, wherein at least some of the light is reflected by the object;

using a hyperspectral imaging sensor to capture, based on the reflected light, one or more hyperspectral images of the object, the one or more hyperspectral images comprising hyperspectral data;

inputting the one or more hyperspectral images to a trained machine learning model, comprising inputting to the trained machine learning model, pixel-by-pixel, each pixel of the one or more hyperspectral images, and the hyperspectral data associated with each pixel;

using the trained machine learning model to spectrally un-mix, pixel-by-pixel, the hyperspectral data associated with each pixel so as to extract one or more spectral signatures from the hyperspectral data; and identifying, based on the one or more extracted spectral signatures, one or more materials comprised in the object.

2. The method of claim 1, wherein the object is at least partially transparent to visible light.

3. The method of claim 1, wherein the object is a multilayered object, each layer comprising one or more materials.

4. The method of claim 1, wherein the light has at least an infrared component.

5. The method of claim 1, wherein the trained machine learning model comprises at least one trained neural network.

6. The method of claim 5, wherein the neural network is a convolutional neural network (CNN) comprising one or more 1-dimensional convolutions.

7. The method of claim 5, wherein the trained neural network is a transformer.

8. The method of claim 1, wherein extracting the one or more spectral signatures from the hyperspectral data comprises:

identifying, within the hyperspectral data, one or more spectral signatures, each identified spectral signature corresponding to a respective spectral signature in a set of predefined spectral signatures associated with predefined materials; and extracting the one or more identified spectral signatures.

9. The method of claim 1, wherein inputting the one or more hyperspectral images to the trained machine learning model comprises:

compressing, using a first computer device, the one or more hyperspectral images;

transmitting the compressed one or more hyperspectral images over a computer network to a second computer device;

decompressing, using the second computer device, the compressed one or more hyperspectral images; and inputting decompressed one or more hyperspectral data images to the trained machine learning model.

10. The method of claim 9, wherein the first computer device comprises a Field-Programmable Gate Array (FPGA).

11. The method of claim 9, wherein the second computer device comprises an FPGA.

12. The method of claim 11, wherein, during the illuminating, the object is moving is relative to the hyperspectral imaging sensor.

13. The method of claim 1, wherein the trained machine learning model is a first trained machine learning model, and wherein the method further comprises:

determining, using a second trained machine learning model and based on the one or more hyperspectral images, a shape of the object.

14. The method of claim 13, wherein determining the shape of the object comprises:

obtaining visible image data of the object;

inputting the visible image data to the second trained machine learning model; and using the second trained machine learning model to determine, based on the visible image data, the shape of the object.

15. The method of claim 1, wherein identifying the one or more materials comprises:

identifying, for each of the one or more materials, an amount of the material relative to an amount of each other material.

16. The method of claim 1, wherein:

spectrally un-mixing the hyperspectral data comprises extracting, for each pixel, one or more spectral signatures from the hyperspectral data associated with the pixel; and identifying the one or more materials comprises identifying, for each pixel and based on the one or more extracted spectral signatures, one or more dominant materials in a portion of the object corresponding to the pixel.

17. The method of claim 16, wherein identifying the one or more dominant materials comprises:

identifying, for at least one pixel of the pixels, multiple materials in the portion of the object corresponding to the at least one pixel; and identifying, from among the multiple materials, the one or more dominant materials.

18. The method of claim 17, wherein identifying the one or more dominant materials comprises:

applying one or more thresholds to each spectral signature associated with each of the multiple materials; and identifying the one or more dominant materials based on the application of the one or more thresholds.

19. The method of claim 17, wherein identifying the one or more dominant materials comprises:

for each of one or more other pixels of the pixels, determining at least one dominant material in a portion of the object corresponding to the other pixel; and identifying the one or more dominant materials based on each determined dominant material of each other pixel.

20. The method of claim 1, wherein inputting each pixel to the trained machine learning model comprises inputting, for each pixel, a 1-dimensional vector representing the pixel and the hyperspectral data associated with the pixel to the trained machine learning model.

21. A hyperspectral imaging system comprising:

a light source for emitting light;

a hyperspectral imaging sensor;

one or more computer processors; and a computer-readable medium storing computer program code configured, when executed by the one or more computer processors, to cause the one or more computer processors to perform a method comprising:

controlling the light source to illuminate an object;

receiving, from the hyperspectral imaging sensor, one or more hyperspectral images of the object captured in response to at least some of the emitted light being reflected by the object and being received at the hyperspectral imaging sensor, the one or more hyperspectral images comprising hyperspectral data;

inputting the one or more hyperspectral images to a trained machine learning model, comprising inputting to the trained machine learning model, pixel-by-pixel, each pixel of the one or more hyperspectral images, and the hyperspectral data associated with each pixel;

using the trained machine learning model to spectrally un-mix, pixel-by-pixel, the hyperspectral data associated with each pixel so as to extract one or more spectral signatures from the hyperspectral data; and identifying, based on the one or more extracted spectral signatures, one or more materials comprised in the object.

22. A non-transitory computer-readable medium storing computer program code configured, when executed by a processor, to cause the processor to:

receive one or more hyperspectral images of an object, the one or more hyperspectral images comprising hyperspectral data;

input the one or more hyperspectral images to a trained machine learning model, comprising inputting to the trained machine learning model, pixel-by-pixel, each pixel of the one or more hyperspectral images, and the hyperspectral data associated with each pixel;

use the trained machine learning model to spectrally un-mix, pixel-by-pixel, the hyperspectral data associated with each pixel so as to extract one or more spectral signatures from the hyperspectral data; and identify, based on the one or more extracted spectral signatures, one or more materials comprised in the object.

* * * * *